(12) United States Patent
Rutar

(10) Patent No.: US 12,098,776 B2
(45) Date of Patent: Sep. 24, 2024

(54) FLOW CONTROL DEVICES

(71) Applicant: Hamilton Sundstrand Corporation, Charlotte, NC (US)

(72) Inventor: Matej Rutar, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/225,054

(22) Filed: Jul. 21, 2023

(65) Prior Publication Data

US 2023/0392706 A1 Dec. 7, 2023

Related U.S. Application Data

(62) Division of application No. 17/581,656, filed on Jan. 21, 2022, now abandoned.

(51) Int. Cl.
| | | |
|---|---|---|
| *F16K 1/36* | (2006.01) | |
| *F16K 1/20* | (2006.01) | |
| *F16K 3/26* | (2006.01) | |
| *F16K 31/00* | (2006.01) | |

(52) U.S. Cl.
CPC .......... *F16K 31/008* (2013.01); *F16K 1/2014* (2013.01); *F16K 1/36* (2013.01); *F16K 3/267* (2013.01)

(58) Field of Classification Search
CPC ..... F16K 1/00; F16K 1/34; F16K 1/36; F16K 1/54; F16K 1/165; F16K 1/2021; F16K 1/2014; F16K 3/267; F16K 31/004
See application file for complete search history.

(56) References Cited

U.S. PATENT DOCUMENTS

| | | | |
|---|---|---|---|
| 1,788,763 A | 1/1931 | Gant et al. | |
| 5,054,522 A | 10/1991 | Kowanz et al. | |
| 5,094,270 A | 3/1992 | Reimert | |
| 5,148,833 A | 9/1992 | Ota | |
| 5,349,986 A | 9/1994 | Sullivan et al. | |
| 5,586,745 A * | 12/1996 | Knapp | F16K 1/38 |
| | | | 251/903 |
| 7,077,379 B1 * | 7/2006 | Taylor | F16K 31/004 |
| | | | 239/102.2 |
| 8,631,825 B2 | 1/2014 | Lee et al. | |
| 9,366,352 B2 | 6/2016 | Kraus et al. | |

(Continued)

FOREIGN PATENT DOCUMENTS

| | | |
|---|---|---|
| DE | 3917423 C1 | 5/1990 |
| DE | 102014204120 A1 | 9/2015 |

(Continued)

OTHER PUBLICATIONS

Extended European Search Report for European Patent Application No. EP23152748.2, dated Jun. 19, 2023.

*Primary Examiner* — Kelsey E Cary
(74) *Attorney, Agent, or Firm* — Kinney & Lange, P.A.

(57) ABSTRACT

In accordance with at least one aspect of this disclosure, a flow control device can include, a first plate having one or more windows defining a flow path therethrough, a second plate configured to abut the first plate, and an actuator operatively connected to one or more of the first plate and/or the second plate. The actuator can be configured to drive the first plate and/or the second plate relative to one another to enlarge or reduce the flow path through the one or more windows in the first plate.

16 Claims, 2 Drawing Sheets

(56) References Cited

U.S. PATENT DOCUMENTS

| | | |
|---|---|---|
| 10,174,858 B2 | 1/2019 | Hirata et al. |
| 10,227,999 B2 | 3/2019 | Potter et al. |
| 10,598,297 B2 | 3/2020 | Wiktorko |
| 11,022,230 B2 | 6/2021 | Ohrem et al. |
| 11,067,187 B2 | 7/2021 | Hagstrom et al. |
| 11,180,242 B2 | 11/2021 | Shmilovich et al. |
| 2002/0178902 A1 | 12/2002 | Trzmiel et al. |
| 2004/0061084 A1 | 4/2004 | Baumann |
| 2009/0039303 A1* | 2/2009 | Hertzog .................. F16K 35/00 251/231 |
| 2011/0083746 A1 | 4/2011 | Hoang |
| 2019/0093774 A1* | 3/2019 | Ishibashi ............... F16K 27/003 |
| 2019/0145214 A1 | 5/2019 | Rao |
| 2020/0307820 A1 | 10/2020 | Ha |
| 2021/0348689 A1 | 11/2021 | Mann, III |

FOREIGN PATENT DOCUMENTS

| | | |
|---|---|---|
| GB | 678124 A | 8/1952 |
| KR | 20180049671 A | 5/2018 |

\* cited by examiner

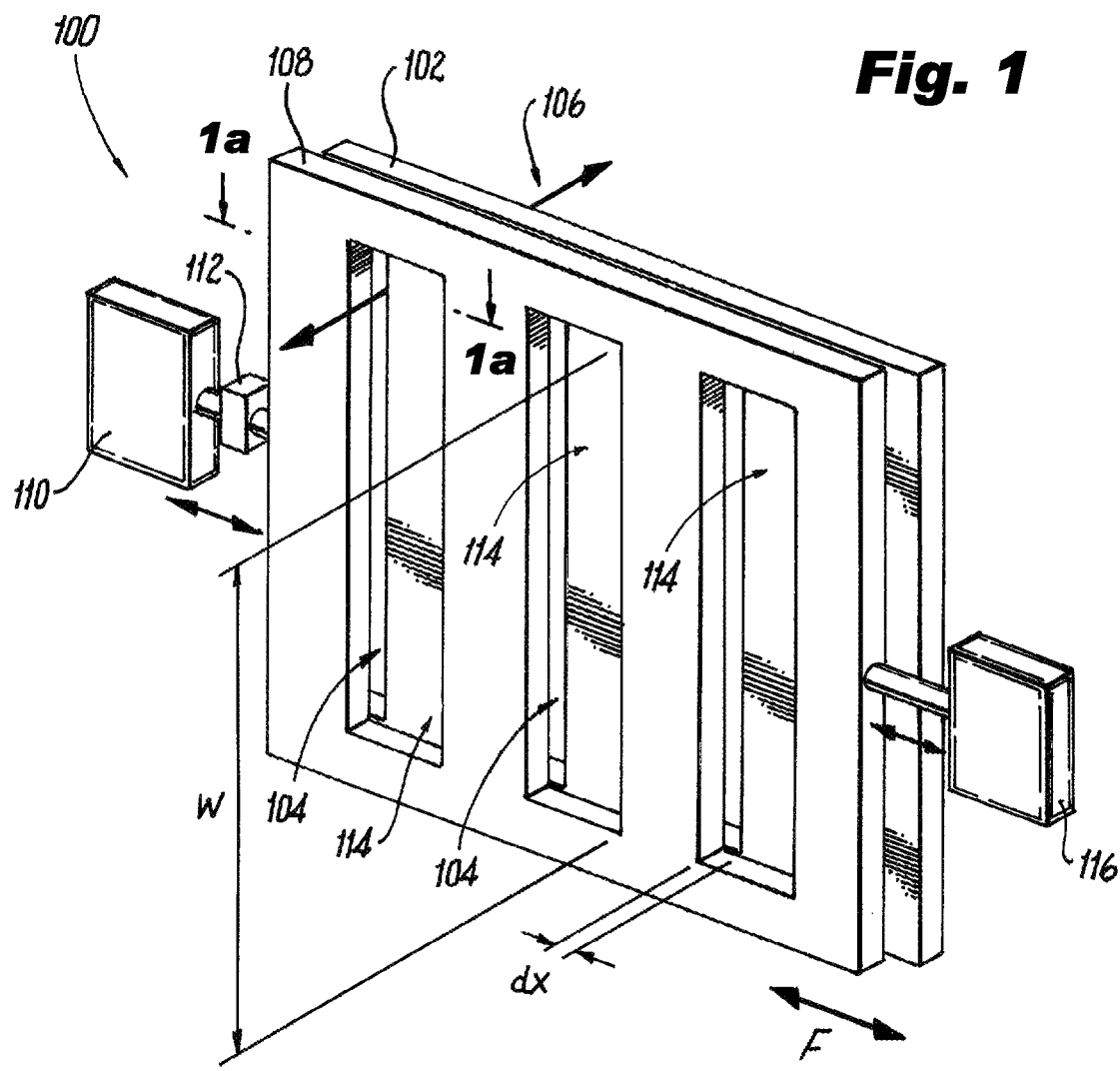
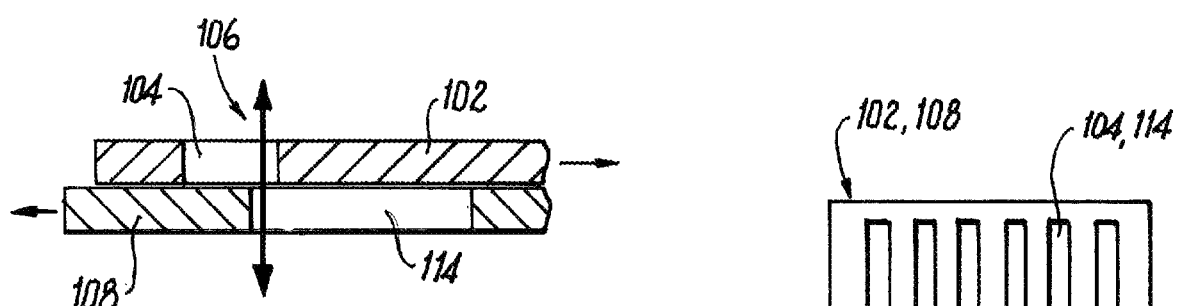
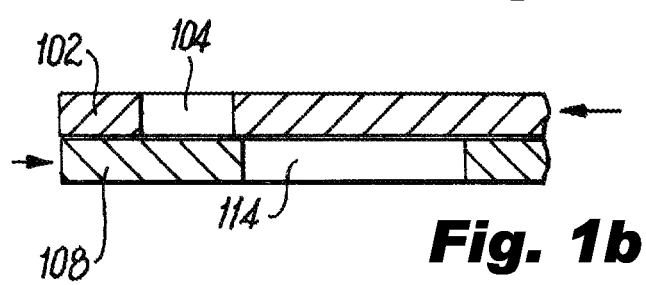
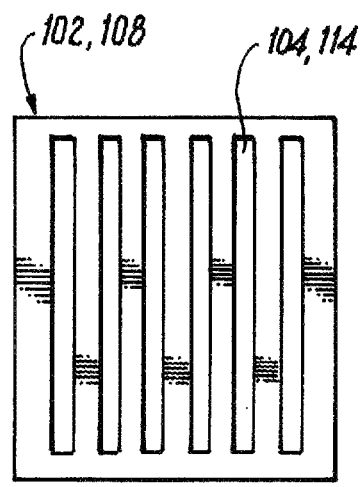
Fig. 1
Fig. 1a
Fig. 1b
Fig 2

FLOW CONTROL DEVICES

CROSS-REFERENCE TO RELATED APPLICATIONS

This application claims priority to and the benefit of U.S. patent application Publication Ser. No. 17/581,656, filed Jan. 21, 2022, the entire contents of which are herein incorporated by reference in their entirety.

TECHNICAL FIELD

The present disclosure relates to flow control devices.

BACKGROUND

Typical flow control devices may include a poppet style or spool and sleeve configuration where a relatively large displacement is needed to achieve a sufficient flow area. Such devices conventionally are used in conjunction with a hydraulic control valve or can be moved through electrohydraulic items such as an EHSV or solenoid. However, such conventional methods can be improved to have faster dynamic response and better steady state accuracy, for example in systems where the limitations of purely hydraulic or electro-hydraulic designs has been reached.

There remains a need in the art of flow control for utilizing actuation devices that offer faster response rates, high output forces, nanometer positional accuracy, but limited displacement. This disclosure provides a solution for this need.

SUMMARY

In accordance with at least one aspect of this disclosure, a flow control device can include, a first plate having one or more windows defining a flow path therethrough, a second plate configured to abut the first plate, and an actuator operatively connected to one or more of the first plate and/or the second plate. The actuator can be configured to drive the first plate and/or the second plate relative to one another to enlarge or reduce the flow path through the one or more windows in the first plate. In certain embodiments, a force sensor can be operatively connected between the actuator and the first plate to sense a force applied to the first plate, where readings from the force sensor can be used to compensate for any friction or other forces that could cause deflection in the system.

In certain embodiments, the second plate can include one or more windows offset from the one or more windows in the first plate, such that the actuator is configured to drive the first plate and/or the second plate relative to one another, perpendicular to the flow path, to enlarge or reduce the flow path through the one or more windows in the first plate and the one or more windows in the second plate. In certain such embodiments, the actuator may be connected only to the first plate, and the second plate can be stationary relative to the first plate. In certain embodiments, the actuator can be a first actuator operatively connected to the first plate, and a second actuator can be operatively connected to the second plate to drive the second plate relative to the first plate.

In embodiments, a total valve window area of the flow control device can be determined as a function of a number of windows in the first plate and the second plate, for example rather than a size of the flow control device, or the displacement of a single orifice. In certain embodiments, the first plate and the second plate can include a grate profile.

In certain embodiments, the second plate can include one or more protrusions configured to align with and insert into the one or more windows of the first plate. In certain such embodiments, in a closed state, the one or more protrusions can be configured to block the flow path through the one or more windows in the first plate. In embodiments, the actuator can be operatively connected to the second plate to drive the second plate relative to the first plate, parallel to the flow path, to enlarge or reduce the flow path through the one or more windows in the first plate and around the one or more protrusions in the second plate.

In certain embodiments, the actuator may be operatively connected only to the second plate, and the first plate can remain stationary relative to the second plate. In embodiments, a curtain area of the flow control device can be determined as a function of a number of windows in the first plate. In certain embodiments, the first plate and the second plate form a poppet flow control device.

In embodiments, the actuator can include a piezoelectric actuator. In certain embodiments, the piezoelectric actuator can be configured to actuate a lever arm, where the lever arm is operatively connected to the first plate or the second plate to drive the first plate or second plate. In certain embodiments, the piezoelectric actuator can be configured to actuate a cam, where the cam is operatively connected to the first plate or the second plate to drive the first plate or second plate. In certain embodiments, the piezoelectric actuator can be a first piezoelectric actuator, and a second piezoelectric actuator can be operatively connected to the first piezoelectric actuator (e.g., stacked) configured to increase a total displacement of the first and second piezoelectric actuators together.

In accordance with at least one aspect of this disclosure, a flow control system can include, a fluid source configured to provide fluid to a fluid destination via a fluid line, and a flow control device disposed in the fluid line configured to control flow from the fluid source to the fluid destination. The flow control device can be or include one or more of the flow control devices as described herein. In embodiments, the flow control device can be additively manufactured or otherwise manufactured to occupy a relatively small physical space, but maintaining the possibility for relatively large flow therethrough. Total flow through the flow control device can be controlled as a function of a number of the one or more windows in the first plate.

In accordance with at least one aspect of this disclosure, a method can include controlling, with a piezoelectric actuator, a flow control device disposed in a fluid system. Controlling can include driving one or more of a first plate and/or a second plate of the flow control device to allow flow to pass through the one or more windows in the first plate and through or more windows in the second plate or around one or more protrusions in the second plate.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic plan view of a flow control device in accordance with this disclosure, showing an embodiment of a grate style flow control device;

FIG. 1a is a partial cross sectional plan view of the flow control device of claim 1, showing the flow control device in an open state;

FIG. 1b is a partial cross sectional plan view of the flow control device of claim 1, showing the flow control device in closed state;

FIG. 2 is a schematic plan view of a flow control device in accordance with this disclosure, showing another embodiment of a grate style flow control device;

DETAILED DESCRIPTION

Figure 3:
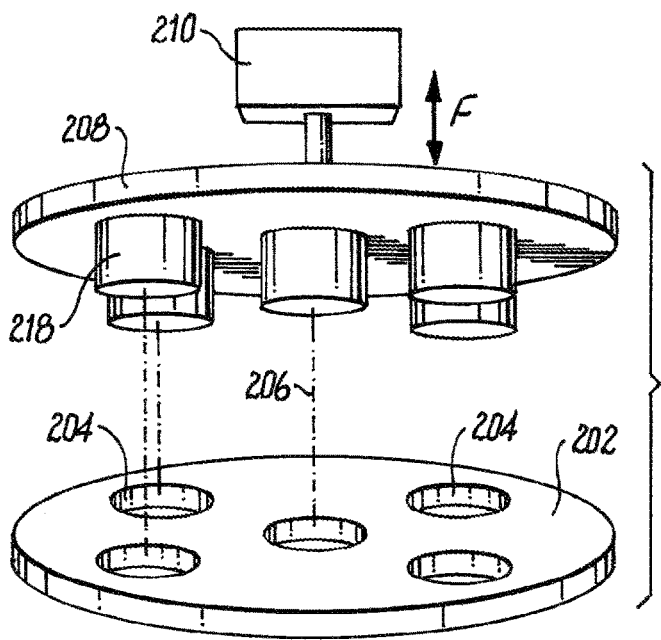
FIG. 3 is a schematic perspective view in accordance with this disclosure, showing an embodiment of a poppet style flow control device.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-9.

In accordance with at least one aspect of this disclosure, a flow control device 100 can include, a first plate 102 having one or more windows 104 defining a flow path 106 therethrough, a second plate 108 configured to abut the first plate 102, and an actuator 110 operatively connected to one or more of the first plate 102 and/or the second plate 108. The actuator 110 can be configured to drive the first plate 102 and/or the second plate 108 relative to one another to enlarge or reduce the flow path 106 through the one or more windows 104 in the first plate 102 (e.g., as illustrated in FIGS. 1a and 1b). In certain embodiments, a force sensor 112 can be operatively connected between the actuator 110 and the first plate 102 to sense a force F applied to the first plate 102, where readings from the force sensor 112 can be used to compensate for any friction or other opposite acting forces that could cause deflection in the system 100.

In certain embodiments, the second plate 108 can include one or more windows 114 offset from the one or more windows 104 in the first plate 102, such that the actuator 110 is configured to drive the first plate and/or the second plate relative to one another, perpendicular to the flow path 106, to enlarge or reduce the flow path through the one or more windows 104 in the first plate 102 and the one or more windows 114 in the second plate 108. In certain such embodiments, the actuator 110 may be connected only to the first plate 102, and the second plate 108 can be stationary relative to the first plate 102. In certain embodiments, the actuator 110 can be a first actuator 110 operatively connected to the first plate 102, and a second actuator 116 can be operatively connected to the second plate 108 to drive the second plate 108 relative to the first plate 102 (e.g., for redundancy).

In embodiments, a total valve window area (e.g., W×d×n windows) of the flow control device 100 can be determined as a function of a number of windows n in the first plate 102 and the second plate 108, for example rather than a size of the flow control device, or the displacement of a single orifice. In certain embodiments, such as shown in FIG. 1, the first and second plates 102, 108 can include three windows 104, 114 each, however any suitable number of windows is contemplated herein, such as six shown in FIG. 3. In certain embodiments, such as shown in FIGS. 1-2, the first plate 102 and the second plate 108 of the device 100 can include a grate profile.

Figure 4:
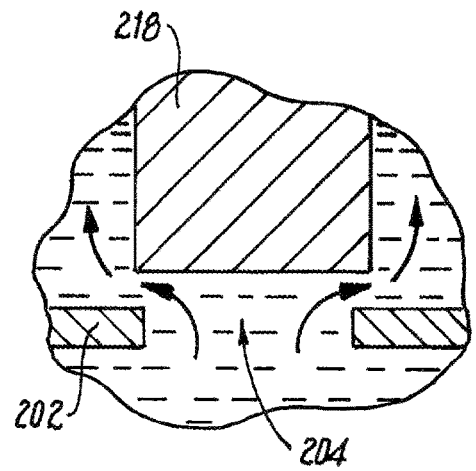
FIG. 4 is an enlarged, partial schematic plan view of the flow control device of FIG. 3.

In certain embodiments, such as the flow control device 200 shown in FIGS. 3-4, the second plate 208 can include one or more protrusions 218 configured to align with and insert into the one or more windows 204 (e.g., orifices) of the first plate 202. In certain such embodiments, in a closed state (e.g., when the second plate is fully inserted into the first plate), the one or more protrusions can be configured to block the flow path 206 through the one or more windows 204 in the first plate 202. In embodiments, the actuator 210 can be operatively connected to the second plate 208 to drive the second plate 208 relative to the first plate, parallel to the flow path 206, to enlarge or reduce the flow path 206 through the one or more windows 204 in the first plate 202 and around the one or more protrusions 218 in the second plate 208 (e.g., as shown in FIG. 4).

In certain embodiments, such as shown, the actuator 210 may be operatively connected only to the second plate 208, and the first plate 202 can remain stationary relative to the second plate 208. In embodiments, a total curtain area of the flow control device 200 can be determined as a function of a number of windows 204 in the first plate 202. In certain embodiments, the first plate 202 and the second plate 208 can form a poppet (or multi-opening poppet) flow control device 200.

Figure 5:
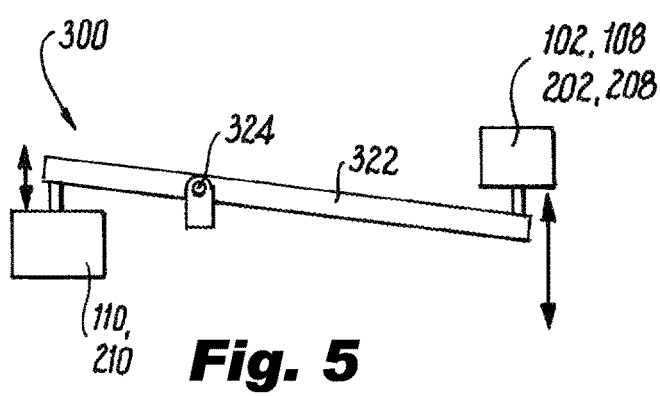
FIG. 5 is a schematic plan view of control device in accordance with this disclosure, showing a means for actuating the flow control device.
Figure 6:
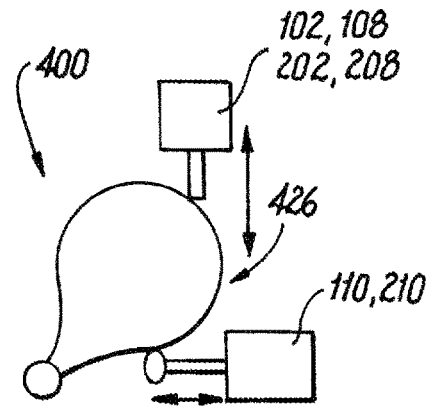
FIG. 6 is a schematic plan view of control device in accordance with this disclosure, showing another means for actuating the flow control device.
Figure 7:
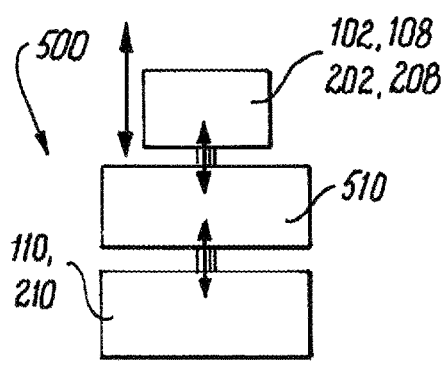
FIG. 7 is a schematic plan view of control device in accordance with this disclosure, showing another means for actuating the flow control device.

In embodiments, the actuator 110, 210 can include a piezoelectric actuator, configured to directly drive the first plate 102, 202 and/or the second plate 108, 208 (e.g., as shown in FIGS. 1 and 2), or indirectly drive the first plate 102, 202 and/or the second plate 108, 208, as described below. In certain embodiments, such as shown in FIG. 5, the piezoelectric actuator 110, 210 can be configured to actuate a lever arm 322, where the lever arm 322 is operatively connected to drive the first plate 102, 202 or second plate 108, 208. A fulcrum 324 of the lever arm 322 can be closer to the actuator 110, 210, than the first plate 102, 202 and/or second plate 108, 208. In certain embodiments, such as shown in FIG. 6, the piezoelectric actuator 110, 210 can be configured to actuate a cam 426, where the cam 426 is operatively connected to drive the first plate 102, 202 or second plate 108, 208. In certain embodiments, such as shown in FIG. 7, the piezoelectric actuator 110, 210 can be a first piezoelectric actuator, and a second piezoelectric actuator 510 can be operatively connected to the first piezoelectric actuator 110, 210 (e.g., stacked as shown) configured to increase a total displacement of the first and second piezoelectric actuators 110, 210 and 510 together.

Figure 8:
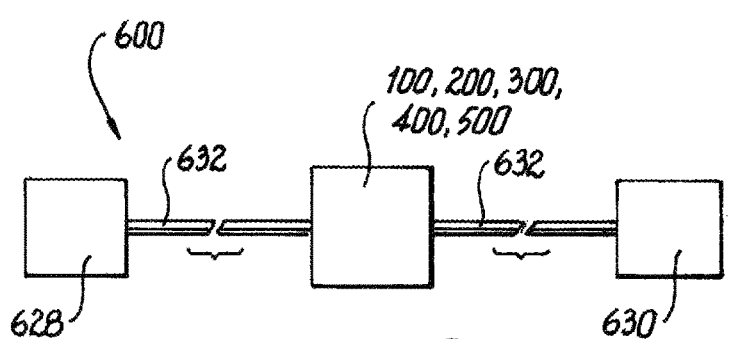
FIG. 8 is a schematic diagram of a fluid system having any of the flow control devices of FIGS. 1-6.

In accordance with at least one aspect of this disclosure, as shown in FIG. 8, a flow control system 600 can include, a fluid source 628 configured to provide fluid to a fluid destination 630 via a fluid line 632, and a flow control device 100, 200, 300, 400, 500 disposed in the fluid line 632 configured to control flow from the fluid source 628 to the fluid destination 630. The flow control device 100, 200, 300, 400, 500 can be or include one or more of the flow control devices 100, 200, 300, 400, 500 as described herein. In embodiments, the flow control device 100, 200, 300, 400, 500 can be additively manufactured or otherwise manufactured to occupy a relatively small physical space (e.g., as compared to traditional flow control or metering devices), but maintaining the possibility for relatively large flow area therethrough. Total flow through the flow control device 100, 200, 300, 400, 500 can be controlled as a function of a number of the one or more windows 104, 204 in the first plate 102, 202 and/or the second plate 108, 208.

In accordance with at least one aspect of this disclosure, a method can include controlling, with a piezoelectric actuator (e.g., actuator 110, 210, 510), a flow control device (e.g., 100, 200, 300, 400, 500) disposed in a fluid system (e.g., fluid system 600). Controlling can include driving one or more of a first plate (e.g., plate 102, 202) and/or a second plate (e.g., 108, 208) of the flow control device to allow flow to pass through one or more windows (e.g., windows 104, 204) in the first plate and/or through one or more windows (e.g., 114, 214) in the second plate or around one or more protrusions in the second plate. In embodiments, controlling the flow control device as described herein can include controlling with a control module, to perform any many or function as described herein. In embodiments the control module can be configured to control the flow control device via computer readable instructions, and based on feedback from one or more sensors (e.g., a force sensor) disposed on or in the flow control device, or disposed in the fluid system.

Embodiments of the flow control device can allow for a range of flow areas to be set by a small displacement device. For a given cross sectional area, a larger curtain area can be achieved by having multiple small openings than a single large opening. Piezoelectric actuators, such as described herein, can allow for much faster actuation and provide greater positional accuracy (e.g., down to nanometers) than conventional actuators, so as to allow for displacement of the flow control devices to be controlled within a small range in a precise manner.

Embodiments can allow for more complex geometries, even with smaller sized devices, which can be more easily manufactured using additive manufacturing. In certain embodiments, variations in part-to-part performance could be compensated with calibration factors stored on a controller operatively connected to the actuator(s), or through 'smart chip' technology.

In embodiments, secondary mechanisms (such as conventional valves) could be included in the fluid system if desired, for example if a leak-free shutoff condition is needed. Embodiments can utilize mechanical arrangements in conjunction with the actuators, such as lever arms, cams, or combining actuators in series could be used to further increase displacement amount. Embodiments include flow control devices with flow window configurations that allow for large flow areas with relatively small displacement of the devices. For example, the flow control devices themselves may displace on the order of millimeters. Even still, because multiple windows can be included in each plate (e.g., tens to hundreds depending on the application and system requirements) collectively the windows provide very large flow areas for minimal displacement. In embodiments, if both plates are connected to an actuator, displacement can be double, or additional actuators may serve for redundancy.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Program code embodied on a computer readable medium may be transmitted using any appropriate medium, including but not limited to wireless, wireline, optical fiber cable, RF, etc., or any suitable combination of the foregoing.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A flow control device, comprising:
   a first plate having one or more windows defining a flow path therethrough;
   a second plate configured to abut the first plate and the second plate having a face; and
   an actuator operatively connected to one or more of the first plate and/or the second plate, configured to drive the first plate and/or the second plate relative to one another to enlarge or reduce the flow path through the one or more windows in the first plate, wherein the second plate includes one or more protrusions smaller than the face of the second plate and configured to align with and insert into and through the one or more windows of the first plate, wherein in a closed state, the one or more protrusions are configured to block the flow path through the one or more windows in the first plate.

2. The flow control device of claim 1, wherein the actuator is operatively connected to the second plate to drive the second plate relative to the first plate, parallel to the flow path, to enlarge or reduce the flow path through the one or more windows in the first plate and around the one or more protrusions in the second plate.

3. The flow control device of claim 2, wherein the first plate is stationary relative to the second plate.

4. The flow control device of claim 1, wherein a curtain area of the flow control device is determined as a function of a number of windows in the first plate.

5. The flow control device of claim 1, wherein the actuator includes a piezoelectric actuator.

6. The flow control device of claim 5, wherein the piezoelectric actuator is configured to actuate a mechanical advantage device, wherein the mechanical advantage device is operatively connected to the first plate or the second plate to drive the first plate or second plate.

7. The flow control device of claim 1, wherein the first plate and the second plate form a poppet flow control device.

8. A flow control system, comprising:
   a fluid source configured to provide fluid to a fluid destination via a fluid line;
   the flow control device of claim 1 disposed in the fluid line configured to control flow from the fluid source to the fluid destination,
   wherein total flow through the flow control device is controlled as a function of a number of the one or more windows in the first plate.

9. The system of claim 8, wherein the actuator is operatively connected to the second plate to drive the second plate relative to the first plate, parallel to the flow path, to enlarge or reduce the flow path through the one or more windows in the first plate and around the one or more protrusions in the second plate.

10. The system of claim 8, wherein the actuator includes a piezoelectric actuator.

11. The flow control device of claim 8, wherein the first plate and the second plate form a poppet flow control device.

12. A method comprising:
    controlling, with a piezoelectric actuator, a flow control device disposed in a fluid system, wherein controlling includes, driving one or more of a first plate which includes one or more windows and/or a second plate which includes a face of the flow control device to allow flow to pass through the one or more windows in the first plate and through or more windows in the second plate or around one or more protrusions in the second plate, the one or more protrusions smaller than the face of the second plate and configured to align with, and insert into and through the one or more windows of the first plate.

13. The method of claim 12, wherein the second plate includes one or more protrusions configured to align with and insert into the one or more windows of the first plate, wherein in a closed state, the one or more protrusions are configured to block the flow path through the one or more windows in the first plate.

14. The method of claim 12, wherein the piezoelectric actuator is operatively connected to the second plate to drive the second plate relative to the first plate, parallel to the flow path, to enlarge or reduce the flow path through the one or more windows in the first plate and around the one or more protrusions in the second plate.

15. The method of claim 12, wherein the piezoelectric actuator is configured to actuate a mechanical advantage device, wherein the mechanical advantage device is operatively connected to the first plate or the second plate to drive the first plate or second plate.

16. The flow control device of claim 12, wherein the first plate and the second plate form a poppet flow control device.

* * * * *